March 20, 1956  E. D. SMYSER  2,738,775
FLUID METERS
Filed March 10, 1952  2 Sheets-Sheet 1

ELMER D. SMYSER
INVENTOR

HUEBNER, BEEHLER,
WORREL & HERZIG
ATTORNEYS

BY

March 20, 1956  E. D. SMYSER  2,738,775
FLUID METERS
Filed March 10, 1952  2 Sheets-Sheet 2
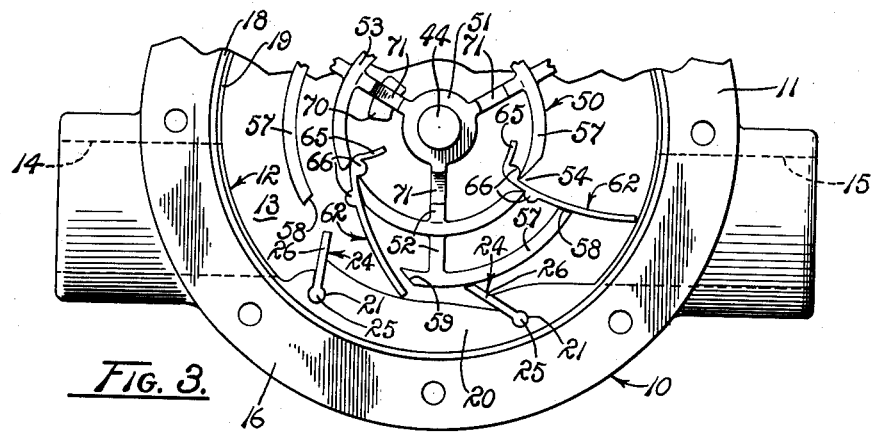
Fig. 3.
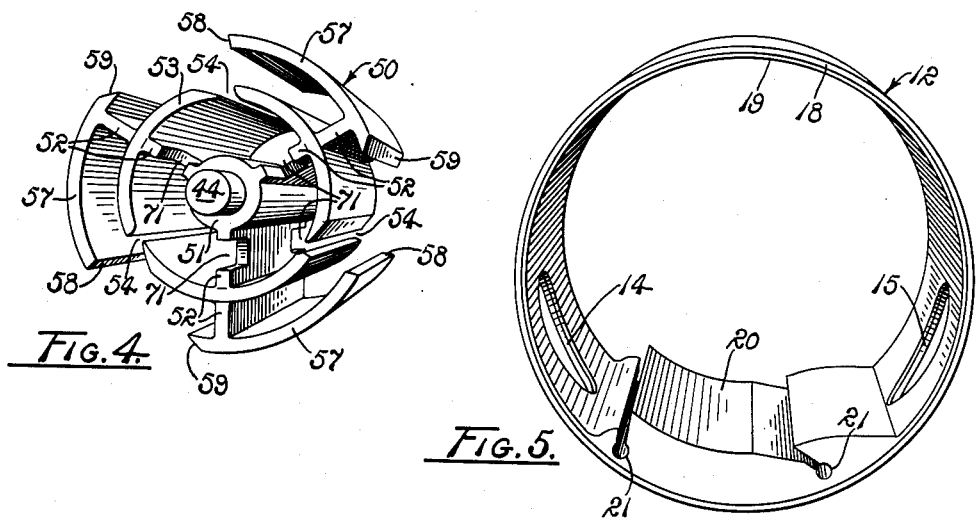
Fig. 4.
Fig. 5.
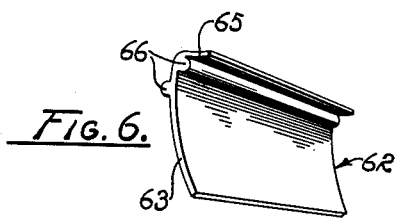
Fig. 6.
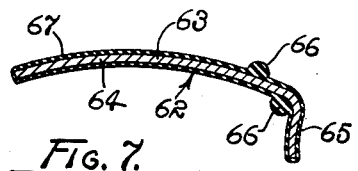
Fig. 7.
ELMER D. SMYSER
INVENTOR
HUEBNER, BEEHLER,
WORREL & HERZIG
ATTORNEYS
BY United States Patent Office 2,738,775
Patented Mar. 20, 1956

2,738,775

FLUID METERS

Elmer D. Smyser, Bakersfield, Calif.

Application March 10, 1952, Serial No. 275,817

11 Claims. (Cl. 121—93)

The present invention relates to rotary fluid motors and more particularly to a fluid flow meter.

Although there are many types of metering devices, there is a demonstrated need for an economical liquid flow meter which is durable and dependable under all normally encountered operating conditions. Fluid flow meters have generally been expensive to produce or subject to operational inaccuracies substantially reducing their utility. Economical meters have generally been subject to inaccuracies incident to leakage and/or excessive drag. They have been unable to pass fluid borne materials, such as sand and gravel, without substantial damage thereto and modification of their operating characteristics. Conventional meters of the type are repaired only with considerable difficulty, labor and expense.

An object of the present invention therefore is to provide an improved fluid motor of the fluid flow metering type that is economical to produce and thoroughly dependable in its operation.

Another object is to provide a fluid flow meter having a minimum of drag and other frictional resistance to operation.

Another object is to provide a meter of the character described having improved accuracy and minimum of leakage even after long periods of operation.

Another object is to provide a fluid meter of simple construction having a minimum number of working parts.

Another object is to provide a fluid meter adapted to pass fluid borne impurities, such as sand and the like, without damage thereto and without appreciable metering errors.

Another object is to provide a flow meter that is durable in structure and speedily and economically repairable.

Further objects and advantages will become apparent in the subsequent description in the specification.

In the drawings:

Fig. 3 is a fragmentary longitudinal section similar to Fig. 1 but showing elements of the meter in a successive operating position.

Fig. 4 is a perspective of a rotor utilized in the meter.

Fig. 5 is a perspective of a replaceable liner utilized in the meter.

Fig. 6 is a perspective of a blade, a plurality of which are releasably located in the rotor shown in Fig. 4 in the fluid flow meter of the present invention.

Fig. 7 is a transverse section through the blade shown in Fig. 6.

Figure 1:
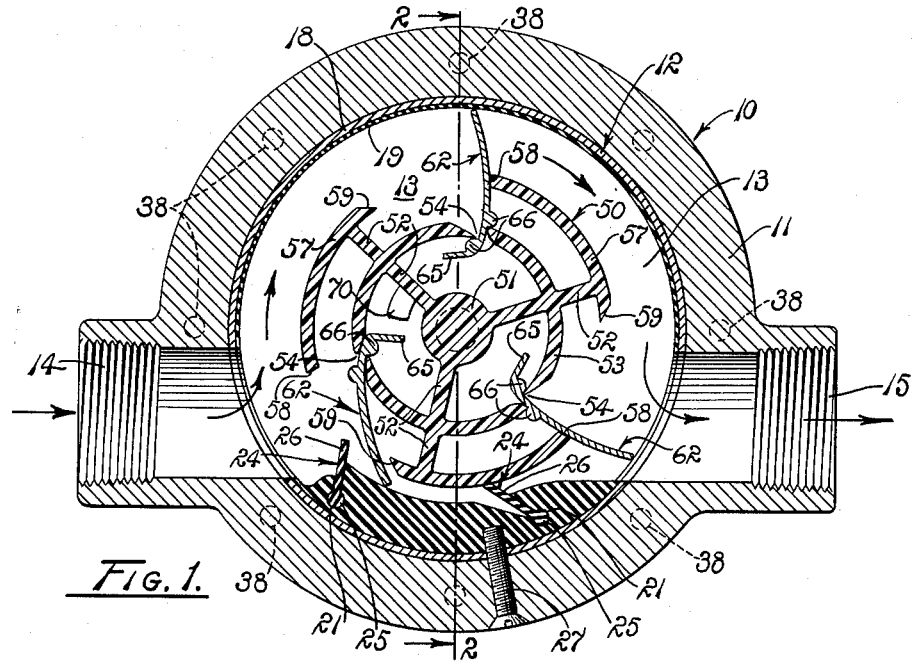
Fig. 1 is a longitudinal section of a fluid flow meter embodying the principles of the present invention.

Referring in greater detail to the drawings:

A body member is indicated generally at 10 including a housing 11 mounting a liner 12 therein. The housing has a substantially cylindrical chamber 13 formed therein provided with an inlet port 14 and an outlet port 15. For convenience of connection, the ports are provided with internal screw threads. At opposite axial ends of the chamber 13 the housing is terminated in parallel face surfaces 16 in planes normal to the axis of the chamber.

It will be noted in Figs. 1 and 3 that the inlet port 14 and the outlet port 15 are aligned eccentrically of the chamber 13 in tangential relation to a circle concentric to the chamber. Although this relation is utilized in commercial forms of the subject invention, it is not regarded as a critical relationship. It is deemed sufficient if the inlet port and outlet port are spaced circumferentially of the chamber.

The liner 12 consists of a cylindrical metal shell 18 slidably fitted to the chamber 13 and providing an inner surface covered with rubber, silicone, plastic, or other corrosion resisting substance 19 vulcanized or otherwise affixed thereon. It will be apparent that the rubber surface or other corrosion resisting substance can be omitted when a fluid to be metered is non-corrosive in character. The liner is provided with an elongated thickened portion, or bridge, 20 longitudinally of the chamber intermediate the ports 14 and 15. The bridge provides a surface inwardly disposed to the chamber which at all points radially of the chamber is longitudinally parallel to the axis thereof. A pair of bores 21 are formed longitudinally in the bridge in parallel relation to the axis of the chamber and each bore slotted to the inner surface of the liner in a direction displaced from radial relation to the chamber toward the inlet port 14.

For purposes soon to become apparent, an auxiliary blade 24 of rubber, plastic or other flexible material is mounted in each of the bores 21 and extended through the bores' respective slots into the chamber 13 for purposes soon to become apparent. The auxiliary blades 24 each conveniently provide a cylindrical roll 25 slidably fitted in its respective bore 21 and a web 26 integral therewith. The liner 12 is releasably slidably fitted to the chamber 13 and locked in position by a set screw 27 extended through the housing into the liner, preferably in the thickened portion thereof, and the auxiliary blades 24 are releasably slidably fitted to the bores 21 and their respective slots.

A gasket 30 is fitted against each face surface 16 of the housing 11 and provides a central bore 31 therethrough. Each gasket preferably consists of a circular back plate 32 of metal or other rigid material inwardly faced with rubber, plastic, or other corrosive resistant material indicated at 33.

A rearward cover 36 is fitted against the gasket 30 on one of the face surfaces 16 and a somewhat similar forward cover 37 is fitted against the gasket 30 of the opposite face surface 16. A plurality of headed bolts 38 are extended through the covers 36 and 37 and screw threadedly mounted in the housing 11 to pull the plates tightly against the gaskets 30 and thus draw the gaskets into fluid tight engagement with the housing. It will be apparent that the surfaces 33 of the gaskets may be provided directly on the inner surfaces of the covers, as desired, and substantially the same result attained as in the use of the separate gaskets.

A pair of axially aligned bearings 40 and 41 are mounted in the covers 36 and 37 respectively concentrically of the chamber 13. The bearing 40 conveniently consists of a sleeve fitted into the rearward cover 36. The bearing 41 is mounted in a bore extended through the forward cover 37 and provides a bore 42 and a counter-bore 43 concentrically aligned with the bearing 40.

Figure 2:
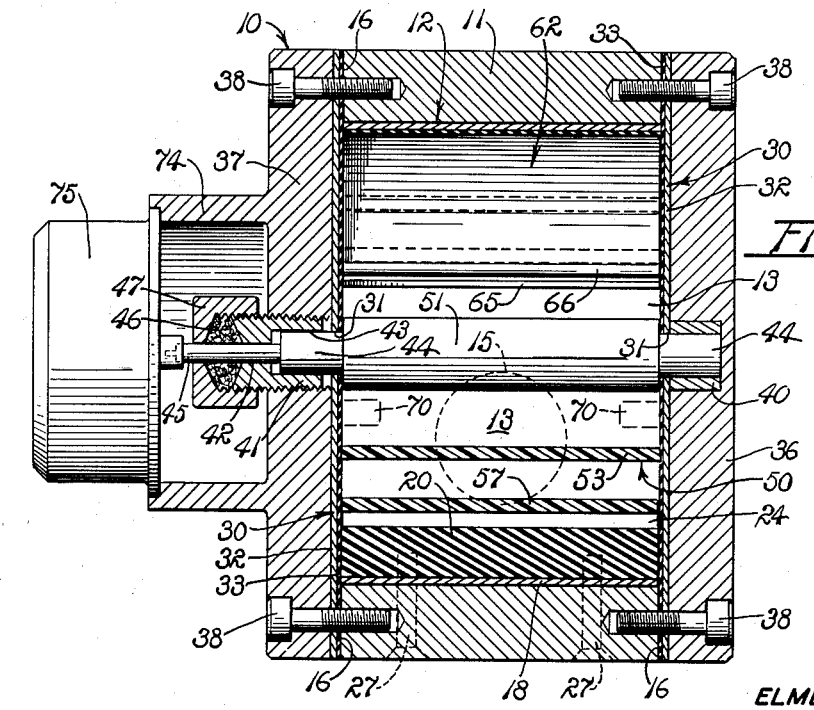
Fig. 2 is a transverse section taken through a complete meter of the type shown in Fig. 1 on a plane represented by the line 2—2.

As evident in Fig. 2, a rotor shaft 44 is mounted in the bearings 40 and 41 and provides an axial extension 45 journaled in the counter-bore 42 and extended outwardly from the bearing 41. To preclude leaking of fluid from the housing 11 about the axial extension 45, an annular packing 46 is mounted on the extension against the outer end of the bearing 41 and compressed into substantially fluid tight engagement with the extension by means of a packing gland 47.

The rotor shaft 44 constitutes an integral part of a rotor indicated generally at 50 cast, fabricated, or otherwise formed of metal, plastic, or other suitable material. The rotor is preferably constructed of non-corrosive material or coated with such a material to minimize corrosion. A hub 51 is provided concentrically of the shaft 44 and extends between the inner surfaces 33 of the gaskets 30. A plurality of partitions 52 are radially extended from the hub in substantially equally spaced relation. Although three partitions are admirably suited to the purpose, it will be evident that the invention is not limited to such number.

An inner cylindrical wall 53 is mounted on the partitions 52 concentrically of the rotor shaft 44. As will subsequently become apparent, it is of importance for opposite ends of the wall 53 to provide substantially fluid tight engagement with the inner surfaces 33 of the gaskets 30. For this purpose, it is preferred to make the wall 53 slightly longer than the spacing of the surfaces 33 and to wear, cut, or otherwise form annular grooves in the surfaces concentric of the shaft 55 to receive opposite ends of the wall in substantially fluid tight rotational engagement. The inner cylindrical wall 53 is slotted longitudinally at 54 substantially midway between each of the partitions and in parallel relation thereto. As viewed in Fig. 1 and as will subsequently become apparent, during operation the rotor is caused to turn in a clockwise direction. The leading edge of each slot is preferably cut or otherwise formed radially of the rotor while the trailing edge of each slot is rearwardly curved.

The partitions 52 are radially extended beyond the inner cylindrical wall 53 and each mounts a fracto-cylindrical wall 57 in radially spaced relation to the inner wall. Each of the fracto-cylindrical walls provides a rearward edge 58 substantially radially aligned with the forward edge of an adjacent slot 54 and an arcuate forward edge 59 forwardly and outwardly disposed from its respective partition.

A flexible blade 62, as shown in Figs. 6 and 7, is releasably mounted in each of the slots 54. The blades 62 are each preferably of a substantially rectangular blank 63 of resilient metal material. Each blade has a transversely slightly concavo-convex portion 64 of a width approximating but slightly greater than the radial spacing of the inner wall 53 from the walls of the chamber 13 defined by the surfaces 33. Each blade also has an inner edge 65 in angular relation to its concavo-convex portion and a pair of parallel longitudinal beads 66 adjacent to the juncture of its concavo-convex portion and inner edge. The blades are preferably coated with a non-corrosive material at 67 and are releasably mounted in the slots 54 by slidable engagement of the portion of the blades intermediate the beads 66 in substantially fluid tight engagement in the slots. As shown, the resultant inner beads are rearwardly disposed from their respective blades and the resultant outer beads forwardly disposed therefrom. For descriptive convenience, the dimension of the blade longitudinally of the rotor 50 is referred to as its "length," the dimension between its inner and outer edges is referred to as its "width," and the distance between its opposite surfaces as its "thickness." A significant feature in connection with the described passage of rocks, sand and gravel is that the blades 62 as well as the auxiliary blades 24 are so dimensioned that when they are fully folded a passage exists circumferentially about the rotor even past the bridge 20.

So mounted, the blades are pivotal between outwardly extended positions in engagement with the rearward edges 58 of their respectively adjacent fracto-cylindrical walls 57 and rearwardly retracted positions in engagement with the forward edges 59 of the rearwardly adjacent fracto-cylindrical walls. When outwardly extended, as evident in Fig. 1, they provide substantially fluid tight frictional engagement with the surfaces 33 bounding the chamber 13.

It will be observed that the auxiliary blades 24 are spaced a distance slightly in excess of the gaps between the fracto-cylindrical walls 57. This assures engagement of not less than one of the auxiliary blades with a fracto-cylindrical wall at all times.

It will be apparent that as the blades 62 are hingeably mounted, they drag into their retracted positions during rotational movement of the rotor 50 by engagement with the bridge 20 and auxiliary blades 24. It will also be apparent that during the rotation of the rotor, the inner edges 65 of the blades traverse a predetermined path of movement about the shaft 44. In order to facilitate movement of each of the blades into its outwardly extended position upon successive passage of the bridge and auxiliary blades 24, a stud 70 is formed integrally with each of the gaskets 30 and inwardly extended therefrom into the path of movement of the inner edges 65 for engagement therewith as their respective blades pass from the bridge 20 and last auxiliary blade. The blades 7 are transversely resilient and when dragged into their rearwardly extended positions, as shown in Fig. 3, are transversely flexed incident to the holding action exerted by the edges of the slots 54 in the inner wall 53. When a blade 62 passes the bridge 20 and the last auxiliary blade 24, it is released from its transverse flexing and tends to spring back into radially disposed position. In actual operation, this resilient return to radially extended position usually occurs in advance of engagement of the inner edges 65 with the studs 70 and the studs serve only as a positive safety factor in assuring proper return in the event the springing action is inadequate or impaired by an obstruction in the fluid or the like.

The studs 70 require notching of the partitions 52 inwardly of the inner cylindrical wall 53 to accommodate rotor rotation. A cylindrical base 74 is outwardly extended from the forward cover plate 37 concentrically of the axial extension 45 and serves to mount an indicator 75 of any suitable form to which visual reference can be made to determine extent of rotor rotation, speed of rotor rotation, and the like. The indicator 75 is connected to the axial extension 45 and is not described in greater detail, inasmuch as many well known forms are suited to the purpose.

*Operation*

The flow meter of the present invention is conveniently assembled by first sliding the blades 62 into the slots 54 and positioning the rotor 50 concentrically in the chamber 13. The auxiliary blades 24 are slidably mounted with their rolls 25 in their respective bores 21 and with their webs 26 extended through their respective slots.

The rearward cover 36 and forward cover 37 rotatably receive opposite ends of the shaft 44 and are bolted into place with the gaskets 30 providing fluid tight engagement with the housing 11.

The flow meter is conveniently mounted in any fluid conduit by screw-threaded engagement of spaced portions of the conduit, not shown, in the inlet port 14 and outlet port 15.

Fluid flowing in the inlet port 14 passes into a compartment defined by the outwardly extended blades 62, the inner cylindrical wall 53, and the wall of the chamber 13. Movement of the fluid into such a compartment forces the compartment to travel away from the inlet port so as to rotate the rotor 50 in a clockwise direction, as shown in Figs. 1 and 3.

As a blade 62 defining a forward wall of any such compartment reaches the outlet port 15 fluid trapped in the compartment is freed for exhaust through the outlet port. By the time such a compartment has reached the outlet port, a following compartment is filled and forced to travel from the inlet port toward the outlet port with its blades 62 in substantially fluid tight frictional engagement with the surface 33.

As a blade 62 is caused to traverse the bridge 20 by rotation of the rotor 50, it is dragged rearwardly to its retracted position. The auxiliary blades 24 slidably engage the retracted blade 62 and preclude fluid passage from the inlet port 14 to the outlet port 15 between the inner cylindrical wall 53 and the bridge.

It will be evident that the hydraulic force exerted on a blade 62 in an extended position is substantially greater than such a force exertable on a retracted blade engaged by the auxiliary blades 24 and/or the bridge 20. The imbalance in hydraulic forces is productive of the described rotation of the rotor 50 registrable on the indicator 75 for visual reference.

Sand or other fluid borne impurities can readily pass through the meter without appreciable damage thereto or modification of its operational characteristics. The described elements of the meter are dependable in their operation and when they become worn or damaged can readily be replaced upon removing either of the covers 36 or 37.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention what I claim as new and desire to secure by Letters Patent is:

1. In a fluid flow meter, the combination of a body member having a substantially cylindrical chamber therein, an inlet port in communication with the chamber, an outlet port in communication with the chamber circumferentially spaced from the inlet port, and an inwardly bulged bridge portion intermediate the outlet port and the inlet port; a rotor rotatably mounted in the body member concentrically of the cylindrical portion of the chamber having a concentric inner cylindrical wall and substantially equally circumferentially spaced fracto-cylindrical wall segments radially spaced concentrically of the inner wall; a blade pivotally mounted on the inner wall of the rotor intermediate each of the fracto-cylindrical wall segments and outwardly extended therefrom for engagement with the body member, the fracto-cylindrical wall segments each having opposite ends engageable with their respective endwardly adjacent blades to limit pivotal movement thereof; and a pair of auxiliary blades mounted longitudinally in the bridge portion of the body member and transversely inwardly extended therefrom for engagement with the fracto-cylindrical wall segments, the auxiliary blades being spaced a distance approximating but greater than the spacing of said fracto-cylindrical wall segments.

2. In a fluid flow meter the combination of a body member having a substantially cylindrical chamber therein, an inlet port in communication with the chamber, an outlet port outwardly directed from the chamber in spaced relation to the inlet port circumferentially of the chamber, and an inwardly bulged portion intermediate the outlet port and the inlet port; a rotor rotatably mounted in the body member concentrically of the cylindrical portion of the chamber having a concentric inner cylindrical wall and concentric fracto-cylindrical wall segments mounted in equally spaced circumferential relation and equally spaced radially outwardly of the inner wall and each having a rearward edge and a forward edge; an elongated blade mounted longitudinally of the rotor on the inner wall thereof radially inwardly from the rearward edge of each of the wall segments and each of said blades being movable between a transversely outwardly extended position against the rearward edge of its respectively adjacent wall segment and a retracted position rearwardly thereof; and a pair of elongated transversely flexible auxiliary blades mounted in the inwardly bulged portion of the body member longitudinally of the chamber and inwardly directed therefrom for engagement with the fracto-cylindrical wall segments, the auxiliary blades being spaced a distance approximating but slightly greater than the spacing of adjacent fracto-cylindrical wall segments.

3. In a fluid flow meter, the combination of a body member having a substantially cylindrical chamber therein, an inlet port in communication with the chamber, an outlet port outwardly directed from the chamber in spaced relation to the inlet port circumferentially of the chamber, and an inwardly bulged portion intermediate the outlet port and the inlet port; a rotor rotatably mounted in the body member concentrically of the cylindrical portion of the chamber having a concentric inner cylindrical wall and concentric fracto-cylindrical wall segments mounted in equally spaced circumferential relation and equally spaced radially outwardly of the inner wall and each having a rearward edge and a forward edge; and an elongated blade mounted longitudinally of the rotor on the inner wall radially inwardly from the rearward edge of each of the wall segments, and each of said blades being movable between a transversely outwardly extended position against the rearward edge of its respectively adjacent wall segment and a retracted position rearwardly thereof against the forward edge of the wall segment rearwardly thereof.

4. In a fluid flow meter, the combination of a housing having a substantially cylindrical chamber therein, an inlet port in communication with the chamber, and an outlet port outwardly directed from the chamber oppositely from the inlet port, the ports being in spaced relation circumferentially of the chamber; a cylindrical liner releasably fitted to the chamber having an elongated thickened portion extended longitudinally of the chamber intermediate the inlet port and the outlet port and the liner being ported in registry with said ports; means securing the liner in fixed position in the housing; a rotor rotatably mounted in the housing concentrically of the chamber having a concentric inner cylindrical wall providing substantially equally spaced longitudinal slots therein, and concentric fracto-cylindrical wall segments mounted in equally spaced peripheral relation radially outwardly of the inner wall each having a rearward edge substantially radially aligned with a slot in the inner wall and an opposite forward edge; and elongated blades of resilient sheet material each having a pair of spaced longitudinal beads releasably pivotally mounted in the inner wall by reception of the portions of the blades between their beads individually in the slots, the blades having transverse dimensions approximating but greater than the radial spacing of the inner wall of the rotor from the walls of the chamber and being pivotal outwardly against the rearward edge of their respectively adjacent fracto-cylindrical wall segments into housing engagement and pivotal rearwardly into retracted positions against the forward edge of their respectively rearwardly adjacent fracto-cylindrical segments.

5. A fluid flow meter comprising a housing having a substantially cylindrical chamber therein, an inlet port in communication with the chamber, and an outlet port outwardly directed from the chamber in spaced relation circumferentially of the chamber from the inlet port; a cylindrical liner releasably fitted to the chamber having an elongated thickened portion extended longitudinally of the chamber intermediate the inlet port and the outlet port, and the liner being ported in registry with said ports; a rotor rotatably mounted in the housing concentrically of the chamber having a concentric inner cylindrical wall providing substantially equally spaced longitudinal slots therein, and concentric fracto-cylindrical wall segments mounted in equally spaced circumferential relation radially outwardly of the inner wall each having a rearward edge substantially radially aligned with a slot in the inner wall and an opposite forward edge; elongated blades of resilient sheet material each having a pair of spaced longitudinal beads releasably pivotally mounted in the inner wall by reception of the portions of the blades between their beads individually in the slots, the blades having transverse dimensions approximating but greater than the radial spacing of the inner wall of the rotor from the housing in circumscribing relation thereto, being pivotal outwardly against the rearward edge of their respectively adjacent fracto-cylindrical wall segments into housing engagement, and pivotal rearwardly into a retracted position against the forward edge of their respectively rearwardly adjacent fracto-cylindrical segments; and an elongated auxiliary blade of flexible material mounted in the thickened portion of the liner longitudinally of the chamber and inwardly extended thereform for engagement with the fracto-cylindrical wall segments.

6. In a fluid flow meter, the combination of a rotor, a housing for the rotor having a chamber therein, the rotor being rotatably mounted in the chamber, said chamber being defined by an inwardly disposed wall of the housing in circumscribing spaced relation to the rotor and having a portion eccentric to the rotor, the housing providing an inlet port at one side of the eccentric portion of the wall of the housing and an outlet port at the opposite side thereof, a plurality of flexible blades mounted on the rotor in substantially equally spaced relation about the periphery thereof and extended outwardly therefrom into housing engagement dividing the chamber about the rotor into compartments, and a pair of flexible blades mounted in the eccentric portion of the wall of the housing and extended into the chamber for rotor engagement, the rotor having a predetermined direction of rotation in the housing and the blades mounted in the rotor being foldable peripherally of the rotor rearwardly of the predetermined direction of rotation of the rotor and the blades mounted in the housing being spaced a distance less than the spacing of the blades in the rotor and foldable from the rotor in the direction of rotation thereof.

7. In a meter for fluid adapted to pass particles of solid materials therethrough, the combination of a housing having a chamber therein and providing an inlet port and an outlet port in communication with the chamber at circumferentially spaced positions, a rotor rotatably mounted in the chamber of the housing having a concentric inner cylindrical wall and a substantially concentric outer cylindrical wall, the outer wall having slots longitudinally thereof in substantially equally spaced relation about the rotor, the periphery of the outer wall of the rotor being in spaced relation to the housing to accommodate the passage of particles of solid material therebetween, resiliently flexible blades mounted on the inner wall of the rotor and extended therefrom through the slots of the outer wall for housing engagement, said blades being individually foldable in a common circumferential direction about the rotor for retraction from the housing, the outer wall of the rotor at opposite sides of the slots limiting foldable movement of the blades extended through the slots, and a pair of resiliently flexible auxiliary blades mounted in the housing intermediate the inlet port and the outlet port and extended inwardly therefrom for rotor engagement, said blades being foldable in the direction opposite to the direction of folding of the blades of the rotor and spaced a distance less than the spacing of the slots in the rotor.

8. In a fluid flow meter, the combination of a housing having a substantially cylindrical chamber therein, an inlet port in communication with the chamber, an outlet port in communication with the chamber circumferentially spaced from the inlet port, and an inwardly bulged bridge portion intermediate the outlet port and the inlet port; a rotor rotatably mounted in the body member substantially concentrically of the cylindrical portion of the chamber; a plurality of flexible blades mounted in substantially equally angularly spaced relation about the periphery of the rotor and outwardly extended therefrom for housing engagement, said blades being somewhat longer than the radial spacing of the cylindrical portion of the chamber from the positions of mounting of the blades on the rotor, the rotor having a predetermined direction of rotation in the housing and said blades being foldable rearwardly relative to such direction of rotation, the cylindrical portion of the housing extending through an arc of an angularity greater than the angularity of spacing of the blades, and a pair of flexible blades mounted in the bridge portion and inwardly extended therefrom for rotor engagement foldable from the rotor in the direction of rotation thereof, said blades of the bridge portion being in spaced relation circumferentially of the rotor of an angularity less than the spacing of the blades on the rotor.

9. In a fluid flow meter, the combination of a body member having a substantially cylindrical chamber therein, an inlet port in communication with the chamber, an outlet port outwardly directed from the chamber in spaced relation to the inlet port circumferentially of the chamber, and an inwardly bulged portion intermediate the outlet port and the inlet port; a rotor rotatably mounted in the body member concentrically of the cylindrical portion of the chamber for rotation in a predetermined direction in the chamber having a hub and concentric fracto-cylindrical wall segments mounted in substantially equally spaced circumferential relation and substantially equally spaced radially outwardly of the hub, each of the wall segments having a rearward edge and a forward edge, the wall segments being in spaced relation to the body member throughout the entire periphery of the body member; a plurality of elongated blades; and means pivotally mounting the blades on the hub longitudinally of the rotor individually adjacent to the wall segments, each of the blades being movable in the direction of rotation of the rotor to a transversely outwardly extended position transversely abutting the rearward edge of its respectively forwardly adjacent wall segment whereby fluid entering the inlet port urges the blades against the rearward edges of said forwardly adjacent wall segments and said blades being movable in a direction opposite to the direction of rotation of the rotor to a retracted position rearwardly of said rearward edges.

10. In a fluid flow meter, the combination of a housing having a substantially cylindrical chamber and providing an inlet port and an outlet port in communication with the chamber at positions spaced circumferentially thereof, a rotor mounted for rotation substantially concentrically in the chamber, the rotor at all positions about the periphery thereof being in spaced relation to the housing to accommodate the passage of rocks and other solid objects in circumscribing relation about the rotor, a plurality of resiliently flexible rotor blades mounted on the rotor in substantially equally spaced relation about the periphery thereof and extended outwardly therefrom into housing engagement dividing the chamber about the rotor into compartments, the rotor blades being foldable inwardly against the rotor in a common circumferential direction about the rotor and being of a thickness substantially less than the peripheral spacing of the rotor from the housing so that when inwardly folded a passage exists between said blades and the housing, and a resiliently flexible auxiliary blade mounted on the housing between the inlet port and the outlet port extended into the chamber into rotor engagement, said auxiliary blade being foldable outwardly toward the housing in a direction circumferentially of the housing opposite to the direction of folding of the rotor blades and being of a thickness substantially less than the peripheral spacing of the rotor from the housing so that when outwardly folded a passage exists between said auxiliary blade and the rotor.

11. In a fluid flow meter, the combination of a housing having a substantially cylindrical chamber and providing an inlet port and an outlet port in communication with the chamber at positions spaced circumferentially thereof, a rotor mounted for rotation substantially concentrically in the chamber, the rotor at all positions about the periphery thereof being in spaced relation to the housing to accommodate the passage of rocks and other solid objects in circumscribing relation about the rotor, a plurality of resiliently flexible rotor blades mounted on the rotor in substantially equally spaced relation about the periphery thereof and extended outwardly therefrom into housing engagement dividing the chamber about the rotor into compartments, the rotor blades being foldable inwardly against the rotor in a common circumferential direction about the rotor and being of such dimensions in relation to the peripheral spacing of the rotor from the housing that when fully inwardly folded a passage exists between said blades and the housing, the periphery of the rotor having openings therein spaced circumferentially thereof in corresponding relation to the rotor blades, and being of substantially the same length peripherally of the rotor, and a plurality of resiliently flexible auxiliary blades mounted in the housing between the inlet port and the outlet port extended into the chamber into rotor engagement, said auxiliary blades being foldable outwardly toward the housing in a common direction circumferential to the rotor opposite to the direction of folding of the rotor blades and being of such dimensions in relation to the peripheral spacing of the rotor from the housing that when outwardly folded a passage exists between said auxiliary blades and the rotor, the auxiliary blades being spaced a distance circumferentially of the chamber less than the spacing of the rotor blades circumferentially of the rotor and being spaced apart a distance greater than the peripheral extent of the openings in the rotor.

References Cited in the file of this patent

UNITED STATES PATENTS

| | | |
|---|---|---|
| 770,712 | Craddock | Sept. 20, 1904 |
| 801,849 | Carpenter | Oct. 17, 1905 |
| 1,046,244 | Yates | Dec. 3, 1912 |
| 2,002,387 | Bannister | May 21, 1935 |
| 2,627,848 | Smith | Feb. 10, 1953 |

FOREIGN PATENTS

| | | |
|---|---|---|
| 455,224 | Germany | Jan. 27, 1928 |